Aug. 8, 1933.   S. J. FINN   1,921,075
TRIMMING MACHINE
Filed Jan. 21, 1930   2 Sheets-Sheet 1

INVENTOR-
Sidney J. Finn
By his Attorney,
Nelson W. Howard

Aug. 8, 1933.  S. J. FINN  1,921,075
TRIMMING MACHINE
Filed Jan. 21, 1930   2 Sheets-Sheet 2
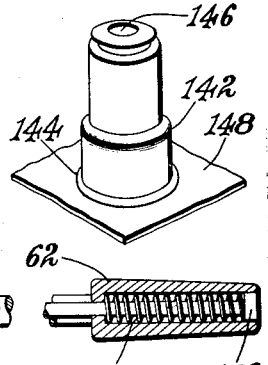
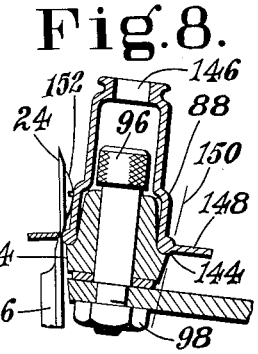
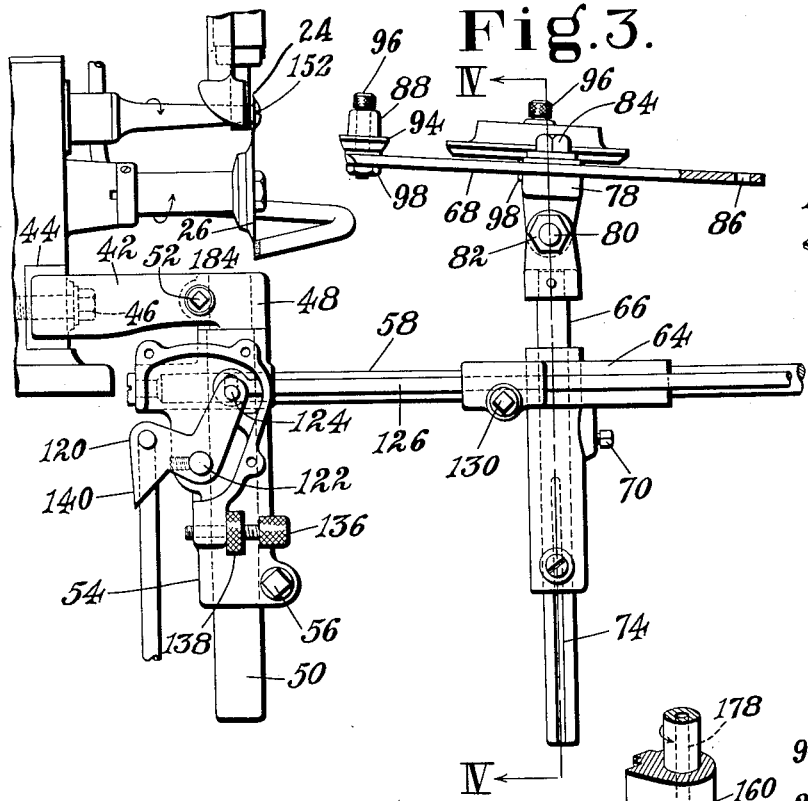
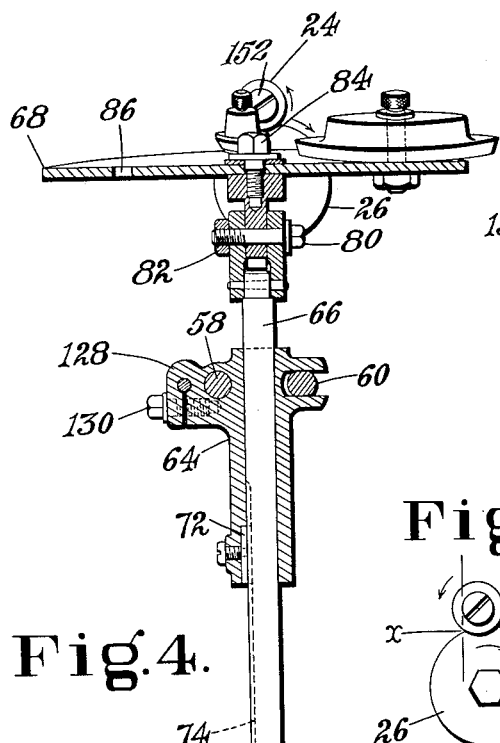
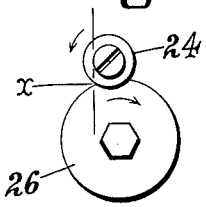
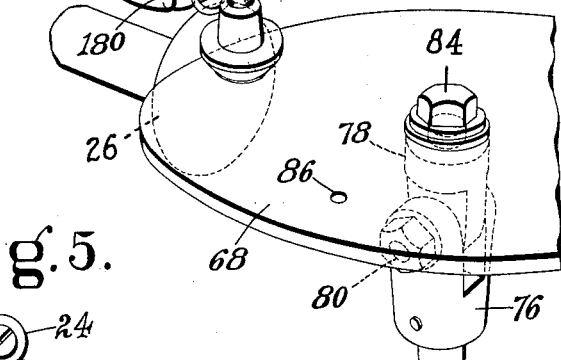
INVENTOR
Sidney J. Finn
By his Attorney,
Nelson W. Howard

Patented Aug. 8, 1933

1,921,075

UNITED STATES PATENT OFFICE 1,921,075

TRIMMING MACHINE

Sidney J. Finn, Beverly, Mass., assignor to United Shoe Machinery Corporation, Paterson, N. J., a Corporation of New Jersey Application January 21, 1930. Serial No. 422,445

14 Claims. (Cl. 164—63)

This invention relates to trimming machines and more especially to work-presenting mechanisms of trimming machines. The invention is herein illustrated as embodied in a machine for trimming fins of overflow from molded rubber articles.

The operation of trimming fins of overflow from articles made of rubber is always attended by a risk of injury to the operator's fingers if the articles are held in the fingers while being trimmed. This risk is obviously greater in the handling of small articles than in the handling of articles of larger sizes and is very great in the case of small articles that require circular trimming. Moreover, in operating upon articles that require circular trimming, whether the articles are large or small, it is practically impossible to manipulate them in such a manner as to cut off all of the overflow without cutting into the body of the article.

In view of the conditions above set forth, an object of the invention is to provide improved means for transferring circular articles of work one at a time from a loading and unloading station to a trimming station, and vice versa, and for holding them while they are being trimmed, to the end that the user's fingers will not be required to approach so closely to the trimming means as to incur any risk of injury and to insure accurate trimming. In the illustrated embodiment of the invention treadle-operated mechanism is provided to furnish the motion by which the articles of work are transferred to and from the trimming station, thus leaving both hands of the user free to mount the untrimmed articles and to demount the trimmed articles.

To provide for trimming articles of various diameters the illustrated machine is designed to utilize alternatively a variety of work-holders differing in size according to the dimensions of the articles to be trimmed. Therefore, in another aspect, an object of the invention is to provide for counteracting diametral differences in various articles of work, to the end that the same or nearly the same length of transferring movement may be utilized for all articles.

With the aforesaid objects in view, a feature of the present invention consists in an improved combination comprising movable work-supporting means, operating means provided with a member having a limited to-and-fro movement for transferring the work-supporting means from a work-receiving station to a trimming station and vice versa, and means forming an adjustable operating connection between the aforesaid member and the work-supporting means to provide for shifting the range of transferring movement of the latter according to the requirements of the work to be trimmed.

In the illustrated machine the movable work-supporting means is mounted on a track, and for convenience the operator sits at one side of the track facing the latter. Hence, the track is transverse to the operator's facing direction, and will not, irrespective of its length, interfere with the operator's body or hinder the operations of placing the articles of work on the work-holder and removing them therefrom.

In some cases it may be desirable, because of the size of certain articles of work or because of the operator's physical proportions or the preferred method of handling the articles, to change the angle of the path of travel of the work-supporting means without altering the position of the trimming mechanism. For example, under some conditions it may be preferable to advance and retract the work in lines at right angles to the plane of the trimming cut, while under other conditions it may be more convenient if the lines of travel are oblique in relation to that plane.

Accordingly, the invention provides for angular adjustment of the track about an axis adjacent to the trimming point. In the illustrated machine this axis is vertical to provide for adjusting the track toward and from the operator without requiring the operator to move from the most comfortable and convenient position with regard to the location of the operating treadle. Hence, while a right-handed operator may work more rapidly and with less fatigue while sitting at one side of the track, a left-handed operator might find that the most desirable working position is at the opposite side of the track. Therefore, if comfort or convenience call for obliquity of the track, such obliquity with respect to a working position at one side of the track would be the reverse of that suitable for a position at the opposite side.

As herein illustrated, the construction that provides for the aforesaid angular adjustment of the track also provides for vertical adjustment thereof to locate the work-holder at the correct level with respect to the cutting point.

Referring to the drawings,

Fig. 3 is an elevation similar to Fig. 1 of the trimming means and the work-presenting mechanism;

Fig. 4 is a vertical section of the structure intersected by the line IV—IV of Fig. 3;

Fig. 5 is an end elevation of the trimming cutters as viewed from the the standpoint of Fig. 4;

Fig. 6 is a perspective view of the elements that function adjacent to the trimming station;

Fig. 7 is a perspective view of a typical example of a molded rubber article having a fin of overflow; and Fig. 8 is a vertical section of an article of work such as that shown in Fig. 7 in process of being trimmed.

Figure 1:
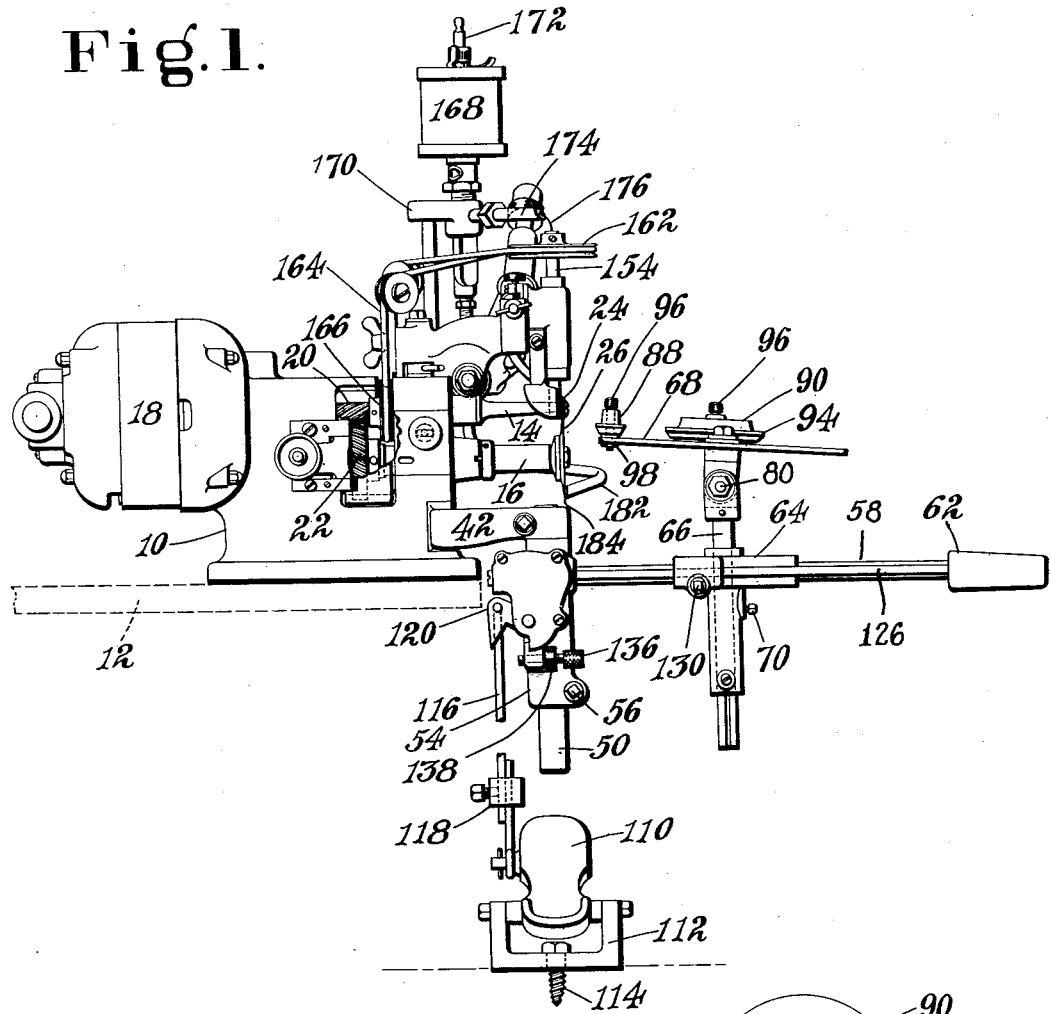
Fig. 1 is an elevation (partly broken away) of a trimming machine embodying the novel features of this invention.

The general organization of the trimming machine herein illustrated, with the exception of the work-presenting mechanism, is similar to that illustrated and described in my co-pending application Serial No. 196,574, filed June 4, 1927. (See United States Letters Patent No. 1,807,835, granted June 2, 1931.) The machine comprises a frame 10 the base of which is adapted to stand on a bench 12 represented conventionally by broken lines. Two horizontal cutter-shafts 14 and 16 arranged one above the other are journaled in bearings formed in the frame 10, the shaft 14 being directly driven, for example, by an electric motor 18. A gear 20 carried by the upper shaft 14 drives a gear 22 carried by the lower shaft 16, these shafts being thus caused to rotate in opposite directions.

Figure 2:
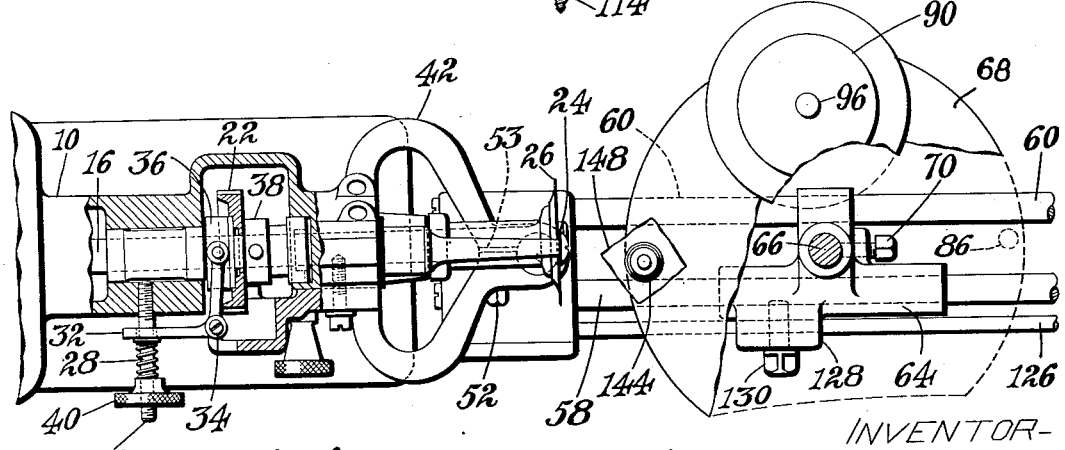
Fig. 2 is a top plan view, partly in section, of a portion of said machine.

Circular, rotary shearing cutters 24 and 26 are affixed, respectively, to the shafts 14 and 16, the upper cutter 24 being in front of the lower cutter 26 as shown in Figs. 4, 5 and 8. The cutters rotate in the directions indicated by arrows in Fig. 5, and their cutting point is therefore located at X. Preferably, the cutter-shafts 14 and 16 are relatively skewed to a slight degree, as shown in Fig. 2, for the purpose of concentrating the pressure of the cutters one against the other at the cutting point X. A light pressure of the cutters is sufficient to maintain their shearing relation when they are operating upon soft, thin material, but a greater degree of pressure is necessary when they are operating upon thicker material and upon the harder grades of rubber. Accordingly, the illustrated machine is provided with adjustable means by which the pressure of the cutters may be regulated as required. For this purpose the cutter-shaft 16 is mounted so that it may have a slight axial movement and it is urged to the right by a compression spring 28 (see Fig. 2). This spring surrounds a pin 30 affixed to and projecting from the frame 10 and exerts it pressure against a bell-crank lever 32 connected to the frame by a pivot member 34. The lever 32 acts against a collar 36 loosely surrounding the shaft 16, while the collar acts against a transverse face of the gear 22. The axial thrust against the gear is transmitted to the shaft by a collar 38 pinned or otherwise affixed to the shaft. The outer end of the pin 30 is provided with a screw-thread on which a thumb-nut 40 is arranged to compress the spring 28 with any desired degree of deflection. The front face of the cutter 26 is thus maintained against the rear face of the cutter 24 with pressure the degree of which may be regulated by turning the nut 40.

The illustrated trimming machine is provided with work-presenting mechanism supported by a bracket 42 mortised into a horizontal groove 44 formed in the frame 10 and affixed to the frame by a bolt 46 (Fig. 3). The bracket projects under the lower cutter 26 and is formed with a socket portion 48 in which the upper end of a vertical cylindrical post 50 is secured by a clamping bolt 52, the socket portion 48 being formed with a kerf 53 (Fig. 2) to provide for a clamping action when the bolt 52 is tightened. The work-presenting mechanism to be described is adjustably secured to the post 50 so that it may be adjusted up and down and may also be adjusted about the axis of the post to vary the angle of approach of the work toward the trimming locality.

A split clamping sleeve 54 is bored for the reception of the post 50 and is provided with a clamping bolt 56 by which it may be contracted to grip the post, the sleeve being adjustable vertically and rotatively with relation to the post. Referring to Figures 2 and 5, it is to be noted that the axis of the post 50 is adjacent to the cutting point X. Two parallel horizontal rods 58 and 60 are affixed to the sleeve 54 and constitute a straight track by which the movable work-supporting means hereinafter described is guided radially with respect to the axis of the post 50 toward and from the trimming means. The outer end of the rods are connected by a spacing and bracing member 62 formed with sockets to receive them.

The movable work-supporting means comprises a sliding carriage 64, a vertical post 66, a turret 68, one or more work-holders and other parts to be described. The post 66 extends through a bore in the carriage 64 and is adjustably secured to the carriage by a bolt 70, this connection providing for vertical adjustment of the work-holder or holders mounted on the post. Turning of the post 66 is prevented by a spline 72 affixed to the carriage 64 and arranged in a groove 74 in the post.

The turret 68 is mounted on the post 66 and secured thereto by relatively adjustable members 76 and 78 through which a horizontal clamping bolt 80 extends to form a knuckle-joint. A nut 82 screwed on the bolt provides for tightening the joint to secure the member 78 at any desired angle. The knuckle-member 76 is affixed to the post 66. The member 78 is bored and tapped to receive a clamping stud 84 extending through a central hole in the turret 68.

The turret is provided with a plurality of holes 86 each adapted to receive a spindle 96 on which a freely rotatable work-holder may be mounted. The holes 86 are preferably situated at various radii a considerable distance apart so that only one work-holder at a time will stand in cooperative relation to the trimming cutters. The stud 84 provides for turning the turret to place the work-holders alternatively in that relation. Moreover, the holes 86 are preferably located at various distances from the center of the turret to afford a choice of location with regard to the diameters of the work-holders. For example, Figs. 1 and 3 illustrate a work-holder 88 of small diameter and a work-holder 90 of larger diameter both mounted on the turret. If it is desired to trim circular articles too large to be mounted on the turret in the manner described, a work-holder of still larger diameter can be mounted directly on the knuckle-member 78 in place of the turret, thus utilizing the axis of the stud 84 or of a replacement stud of suitable length as the axis of rotation of the work-holder.

The illustrated work-holders 88 and 90 are circular, each having a slightly tapered hub portion to dilate and center the articles of work and each having a flange or platform 94 to support the articles at a certain level. The work-holders are bored centrally to receive the spindles 96 which are detachably secured in the holes 86 by clamping nuts 98.

Provision is made for a limited range of travel of the carriage 64 toward and from the axis of the post 50 for the purpose of transferring the articles of work from a loading station to the trimming station and vice versa. As herein shown, a spring is provided to retract the carriage, and manually operative mechanism is provided for advancing the carriage against the stress of the retracting spring. Moreover, the construction is such that the range of travel of the carriage along its track 58, 60 may be shifted with respect to the manually operative means so that the length of travel of the carriage may be substantially the same for all diameters of work.

The illustrated mechanism for moving the carriage 64 to transfer an article of work from its loading station to the trimming station is designed to be operated by a treadle 110 in line with the post 50 (see Fig. 1) and pivotally mounted in a base 112 adapted to be affixed to a floor by a lag-screw 114. The operating motion of the treadle is transmitted by a rod 116 to a bell-crank lever 120 located adjacent to the axis of the post 50. This rod is preferably made in two sections which are adjustably connected by a coupling 118 that provides for the aforesaid angular adjustments and vertical adjustments of the track. The bell-crank lever 120 is mounted on the sleeve 54 by a fulcrum pin 122 and has a pin-and-slot connection 124 with an operating rod 126 parallel to and substantially coextensive with the track-forming rods 58 and 60. The operating rod 126 extends through a split clamping portion 128 of the carriage 64 in which a clamping bolt 130 is arranged to secure the carriage to the operating rod at any desired point along the length of the latter. The outboard end of the operating rod 126 extends through a compression spring 134 contained in the spacing member 62 (see Fig. 3) and is preferably provided with a head 132 against which the spring acts to raise the treadle and retract the movable work-supporting means for the trimming station. Thus, while the carriage 64 is undergoing a preliminary setting lengthwise of its track, the treadle will be maintained in its raised position without requiring any attention of the user.

If, after tightening the clamping bolt 130, it develops that the entire available down-stroke of the treadle is only slightly too much or too little to transfer an article of work to its trimming station, the limit of travel of the carriage 64 toward the trimming means may be regulated by an adjustable stop-screw 136 arranged to be engaged by a projection 140 formed on the bell-crank lever 120 (see Fig. 3). The stop-screw 136 is screwed through a boss formed on the sleeve 54 and is provided with a finger-nut 138 by which it may be secured at any desired position of adjustment.

A typical example of a circular molded rubber article is illustrated in Figs. 2, 7 and 8. This article is a sleeve or nipple intended to be applied to a distributor in the ignition system of an internal combustion engine at a point where one of the ignition cables is connected to the distributor. The larger cylindrical portion 142 of the nipple is of a size to surround and grip an annular flange projecting from the casing of a distributor and is formed with an annular bead 144. The smaller end of the nipple is formed with a hole 146 through which the ignition cable extends.

According to a method commonly practiced in the molding of small rubber articles such as these, gang molds are commonly used to expedite quantity production. Each mold may be provided with forms or cavities for molding from 100 to 400 articles at a time. The overflow that fills the space between the plates of the mold forms a thin sheet by which the molded articles are joined when the molded material is removed from the mold. The sheets of molded articles are first divided into strips by cutting the overflow along substantially parallel courses between the rows of molded articles. Thereafter the severed strips are severed crosswise between the individual molded articles, with the result that each article has a substantially rectangular fin 148 of overflow that requires to be severed flush with the annular bead 144.

Assuming that the illustrated machine is to be used for the purpose of severing the overflow from articles of the type shown in Figs. 7 and 8, the turret 68 will be provided with a freely rotatable work-holder 88 of a size that will fit snugly in the portion 142 of an article. When the article is pressed down to a seat, the bead 144 will lie on the flange 94 of the work-holder. When the article is thus seated, the fin 148 of overflow should register with the cutting point X and the turret 68 should be nearly if not quite horizontal, although a slight inclination thereof, as shown in Figs. 1, 3 and 8 may be desirable but at all events not objectionable. A preliminary adjustment for locating the fin of overflow at the level of the cutting point may be obtained by adjusting the post 66 up or down while the set-screw 70 is relaxed. If, after this adjustment has been made, a finer adjustment for the same purpose is required it may be conveniently obtained by tilting the turret 68 about the axis of the pivot stud 80.

Having completed the adjustment last described, the turret 68 will be adjusted rotatively about the axis of the central clamping bolt 84 to place the axis of the rotary work-holder in register with or very slightly to the left of the cutting point X as illustrated in Fig. 5.

If the preliminary setting of the carriage 64 is not correct for the articles about to be trimmed it will be regulated as hereinbefore explained, merely by sliding the carriage 64 along the rods 58 and 60 while the clamping bolt 130 is relaxed. An operator's estimate of the required initial distance between the cutting point and the retracted work-holder is commonly so nearly correct with regard to the length of travel to be imparted by the treadle 110 that a slight adjustment of the stop-screw 136 suffices to rectify any slight error after the clamping bolt 130 has been tightened. In practice, the stop-screw 136 will be adjusted to arrest the bell-crank lever 120 when the treadle is depressed to a point that will place the perimeter of the bead 144 in tangent relation to the shearing plane. Thus, the work-presenting mechanism is adjusted to insure severing the fin 148 flush with the bead 144 as indicated by a broken line 150 in Fig. 8.

When using the described apparatus the movable work-supporting means is normally retracted to the position shown in Figs. 1, 2 and 3, in which position the rotary work-holder located in cooperative relation to the trimming cutters is about one and one-half inches distant from the cutters. This distance is sufficient to relieve the operator's fingers from the danger of being cut while placing an article of work on a work-holder or removing a trimmed article therefrom. Having mounted an untrimmed article on the work-holder, the operator has merely to depress the treadle 110 to present the article to the cutters, the advancement of the article being arrested by the stop-screw 136 when some pretermined portion of the article, such as the perimeter of the bead 144, is tangent to the shearing plane. Since the cutters 24 and 26 are driven continuously and at a moderately high seed they cut into the fin 148 while the article of work is approaching them, meanwhile turning the article and the work-holder about the axis of the spindle 96. When the cut has progressed to a point tangent to the bead 144 further advancement of the work-supporting means is prevented by the stop-screw 136, but the frictional drag of the cutters continues to turn the article of work and its holder until the fin 148 is entirely severed flush with the bead 144. The severed fin thereupon drops, the operator releases the treadle 110, the spring 134 retracts the work-supporting means to its loading and unloading station, and the operator removes the trimmed article from the work-holder and replaces it with an untrimmed article.

The illustrated apparatus may also be used to trim overflow from non-circular articles held manually. For example, the turret 68 may be used as a rotary or non-rotary work-supporting table according to whether the central clamping stud 84 is set up tightly or relaxed sufficiently to permit rotation thereof. When the turret is used in this manner, the rotary spools or work-holders will be detached therefrom or at least removed from the trimming station so that a bare, unobstructed portion of the turret will be available at the trimming station. Under these conditions, an article of work will be guided and controlled at the trimming station by a combination of devices similar to that illustrated and described in my copending application Serial No. 196,574, filed June 4, 1927.

When a non-circular article is presented to the trimming cutters the face of the article from which the fin of overflow projects is held against the beveled front face of the upper cutter 24 and against the slightly crowned head of the screw 152 by which that cutter is affixed to its shaft 14. At the same time the specified face of the article may also engage a rotary abutment 154 arranged to turn about a vertical axis. One purpose of this abutment is to prevent the specified face of the article from crossing the shearing plane adjacent to the cutting point, since otherwise the cutter might cut into the body of the article as a result of rapid or careless manipulation.

The abutment 154 is located behind the shearing plane but is periphery is tangent to that plane and preferably tangent also to the rear face of the cutter 24 at the feeding-in side of the latter. The lower end of the abutment 154 is slightly above the level of the cutting point X so that the fin of overflow may project under it. To insure the passage of the fin under this abutment, a stationary guide 156 is arranged at the feeding-in side of the rotary abutment. The lower edge of the stationary guide 156 is curved or otherwise inclined to deflect downwardly any distorted portions of overflow material, the lower right hand extremity of this guide being flush with the lower end of the rotary abutment. The articles of work and the operator's fingers are further protected from injury by the cutter 24 by a guard 158 located at the feeding-out side of the cutter.

The rotary abutment 154 is journaled in a bearing piece 160 and is preferably provided with a pulley 162 by which it may be driven to furnish a work-feeding effect supplemental to that of the cutters. As shown in Fig. 1, a belt 164 is arranged to transmit rotation to the pulley 162 from a pulley 166 carried by the cutter-shaft 14.

The illustrated machine also includes means for supplying a lubricating liquid to the cutters, the said means being similar to the corresponding means illustrated and described in my said copending application Serial No. 196,574. A cup 168 for storing a supply of suitable lubricating liquid, such as water with or without a small quantity of kerosene or soap, is supported above the level of the upper end of the rotary abutment 154, a supporting bracket 170 being provided for this purpose. The cup 168 is provided with a suitable needle valve 172 by which the delivery of the lubricating liquid is controlled. The liquid flows by gravity through a nozzle 174, the delivery end of which is above the upper end of the abutment 154. The bore or duct of the nozzle 174 is of capillary diameter and is occupied by one end of a small wire 176 along which the lubricating liquid travels and to which it adheres by surface tension. The other end of the wire 176 projects into a duct 178 formed in the abutment 154, the lower end of this duct communicating with an outlet port 180 extending radially to the periphery of the abutment adjacent to the cutter 24. Thus, the lubricating liquid flows by gravity to the port 180 and is discharged therefrom by centrifugal force against the rear face of the cutter 24. The cup 168 also supplies lubricating liquid to a tube 182, the delivery end of which is located in front of the lower cutter 26 and near the lower portion thereof, a wick or plug 184 of absorbent material such as felt being inserted into the tube and arranged in contact with the cutter.

Having thus described my invention, what I claim as new and desire to secure by Letters Patent of the United States is:

1. In a trimming machine provided with power-operated trimming means, work-presenting mechanism comprising movable work-supporting means, a track by which said work-supporting means is guided toward and from the trimming means, track-supporting means having a pivotal axis adjacent to the trimming locality about which axis the track may be angularly adjusted, transmission mechanism carried by said track-supporting means for moving said work-supporting means along the track, an operating treadle supported otherwise than by said track-supporting means, and means connecting said treadle and said transmission mechanism at a point adjacent to said axis.

2. In a trimming machine provided with power-operated trimming means, work-presenting mechanism comprising a movable work-supporting carriage, a track by which said carriage is guided toward and from said trimming means, clamping means carried by said carriage, an operating rod extending through said clamping means parallel to said track so that the carriage may be secured thereto at various positions along its length, and treadle mechanism arranged to move said rod lengthwise.

3. In a trimming machine provided with a frame and power-operated trimming means mounted therein, work-presenting mechanism comprising a post affixed to said frame, a track mounted on said post, and movable work-supporting means guided by said track toward and from said trimming means, said track being angularly adjustable about the axis of said post to regulate the angle of approach of the work to said trimming means.

4. In a trimming machine provided with a frame and power-operated trimming means mounted therein, work-presenting mechanism comprising a dependent post affixed to the frame, a track mounted on said post, and movable work-supporting means guided by said track toward and from said trimming means, said track being adjustable angularly about the axis of said post and adjustable lengthwise of said axis to shift the lines of travel of said work-supporting means.

5. In a trimming machine provided with power-operated trimming means, work-presenting mechanism comprising a track, a carriage mounted thereon, a supporting member, a freely rotatable work-holder mounted on said supporting member and arranged to be rotated by the operation of said trimming means, and jointed means having a series of adjustable joints by which said supporting member is mounted on said carriage and maintained in various positions according to the requirements of the work to be presented to said trimming means.

6. In a trimming machine provided with power-operated trimming means, work-presenting mechanism comprising a carriage movable toward and from said means, means for guiding said carriage, a supporting member, a freely rotatable work-holder arranged to be rotated by operation of said trimming means and mounted on said supporting member, and vertically adjustable means by which said member is mounted on the carriage, said vertically adjustable means including an adjustable pivotal joint to provide for angular adjustment of said supporting member.

7. In a trimming machine provided with power-operated trimming means, work-presenting mechanism comprising a support movable toward and from said trimming means, mechanism for moving said support as specified, a member provided with a plurality of freely rotatable work-holders of different sizes, and means by which said member is adjustably mounted on said support so that said work-holders may be placed alternatively in cooperative relation to said trimming means.

8. In a trimming machine provided with power-operated trimming means, work-presenting mechanism comprising a carriage, means for guiding the carriage toward and from said trimming means, a freely rotatable work-holder, relatively adjustable members by which said work-holder is mounted on said carriage so that its axis of rotation may be fixed in various angular relations to the carriage, and mechanism arranged to reciprocate the carriage.

9. In a trimming machine provided with power-operated trimming means and a treadle, a freely movable carriage by which a work-piece may be presented to and retracted from said trimming means, a track by which said carriage is guided toward and from said trimming means, and transmission means movable lengthwise of said track for transferring operating motion of said treadle to said carriage, said track and said transmission means being angularly adjustable relatively to said trimming means and said treadle.

10. A trimming machine comprising a track in radial relation to a pivotal axis about which the track is angularly adjustable, trimming means located adjacent to said axis, a work-supporting carriage freely movable on said track toward and from said axis, a transmission member secured to said carriage and extending toward said axis, and operating mechanism connected to said transmission member adjacent to said axis for moving said member and said carriage toward said axis.

11. In a trimming machine provided with power-operated trimming means, a freely rotatable work-holder, a freely movable carriage on which said work-holder is mounted, a track by which said carriage is guided toward and from said trimming means, and manually operable means by which said carriage may be reciprocated along said track, said trimming means being constructed and arranged to rotate an article of work on said holder while trimming the article.

12. In a trimming machine provided with power-operated trimming means, an elongated member, a spring arranged to move said member lengthwise in one direction, treadle mechanism arranged to move said member in the opposite direction, a work-supporting carriage, and means by which said carriage may be operatively connected to said elongated member at various positions along the length of the latter, said member being arranged to move said carriage toward and from said trimming means.

13. In a trimming machine provided with power-operated trimming means, a freely rotatable work-holder arranged to be rotated by the operation of said trimming means, adjustable means by which said freely rotatable work-holder is supported in cooperative relation to said trimming means, a work-presenting carriage by which said adjustable supporting means are carried, a track by which said carriage is guided, and manually operable means by which said carriage may be moved to and fro along said track to present and retract a work-piece mounted on said freely rotatable work-holder.

14. In a trimming machine provided with power-operated trimming means, a longitudinally movable rod, a spring arranged to move said rod lengthwise in one direction, treadle mechanism arranged to move the rod in the opposite direction, and a work-supporting carriage provided with clamping means by which it may be operatively connected to the rod at various positions along the length of the rod, said rod being arranged to move the carriage toward and from said trimming means.

SIDNEY J. FINN.